United States Patent
Jaramillo et al.

(10) Patent No.: US 6,397,279 B1
(45) Date of Patent: *May 28, 2002

(54) SMART RETRY SYSTEM THAT REDUCES WASTED BUS TRANSACTIONS ASSOCIATED WITH MASTER RETRIES

(75) Inventors: Ken Jaramillo, Phoenix; Carl J. Knudsen, Gilbert, both of AZ (US)

(73) Assignee: VLSI Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,864
(22) Filed: Jan. 7, 1998
(51) Int. Cl.[7] ............................................... G06F 13/00
(52) U.S. Cl. ...................... 710/110; 710/107; 710/113; 710/266; 710/268; 710/105; 710/108
(58) Field of Search ................................. 710/113, 100, 710/107, 112, 266, 268, 111, 116, 101, 126, 109, 105, 118, 117, 110

(56) References Cited

U.S. PATENT DOCUMENTS

| | | | | |
|---|---|---|---|---|
| 5,546,548 A | * | 8/1996 | Chen et al. | 710/116 |
| 5,555,420 A | * | 9/1996 | Sarangdhar et al. | 710/266 |
| 5,748,900 A | * | 5/1998 | Scott et al. | 709/235 |
| 5,764,929 A | * | 6/1998 | Kelley et al. | 710/107 |
| 5,850,530 A | * | 12/1998 | Chen et al. | 710/113 |

* cited by examiner

Primary Examiner—Rupal Dharia
(74) Attorney, Agent, or Firm—Wagner, Murabito & Hao LLP (57) ABSTRACT

The present invention comprises a smart retry system for agents in a computer system. The smart retry system of the present invention includes a master agent, a slave agent, an arbiter, and smart retry logic components, all adapted to be coupled to a bus. The bus permits agents coupled to the bus to communicate with the arbiter and other agents coupled to the PCI bus. The smart retry logic component of the present invention prevents a PCI master agent from accessing the bus for the purpose of attempting a retry transaction, until after the slave agent that issued the retry is ready.

9 Claims, 9 Drawing Sheets

SMART RETRY SYSTEM THAT REDUCES WASTED BUS TRANSACTIONS ASSOCIATED WITH MASTER RETRIES

TECHNICAL FIELD

The present invention relates to the field of computer system bus architectures. More particularly, the present invention relates to a smart retry system that reduces wasteful retry bus transactions between master devices and slave devices.

BACKGROUND ART

The bus architecture of a computer system substantially influences the manner in which information is communicated between components of a computer system. In a typical computer system, one or more busses are used to connect a central processing unit (CPU) to a memory and to input/output elements. Typically the bus consists of several "lines" of electrically conductive material. The bus permits electrical signals representing data and control instructions to be readily transmitted between different components. The speed at which the components interact with each other over the bus has a substantial impact on the performance and utility of the computer system.

Ordinarily, the faster a computer system component responds to the CPU, the more useful the computer system is to the user. Much of a computer system's functionality and utility is realized through the use of components referred to as peripheral devices. Frequently, the speed at which peripheral devices interact with the rest of the computer system is critical. For many peripheral devices, such as graphics adapters, full motion video adapters, small computer system interface (SCSI) host bus adapters, and the like, it is imperative that large block data transfers be accomplished expeditiously. For example, the speed at which a graphics adapter can communicate its responses is a major factor in a computer system's usefulness as an entertainment device. Or, for example, the speed at which video files can be retrieved from a hard drive and played by the graphics adapter has a significant impact on the computer system's usefulness as a training aid. Hence, the rate at which data can be transferred among various peripheral devices often determines whether the computer system is suited for a particular purpose. These applications are just some examples of subsystems which benefit substantially from a very fast bus transfer rate.

In order to increase the capability of computer systems, the electronics industry has engaged in activities to develop several types of progressively faster bus architectures. Recently, PCI (peripheral component interconnect) bus architecture was developed to provide a high speed, low latency bus architecture from which a large variety of computer systems could be developed. The PCI bus architecture has become one of the most widely used and supported bus architectures in the industry.

Figure 1:
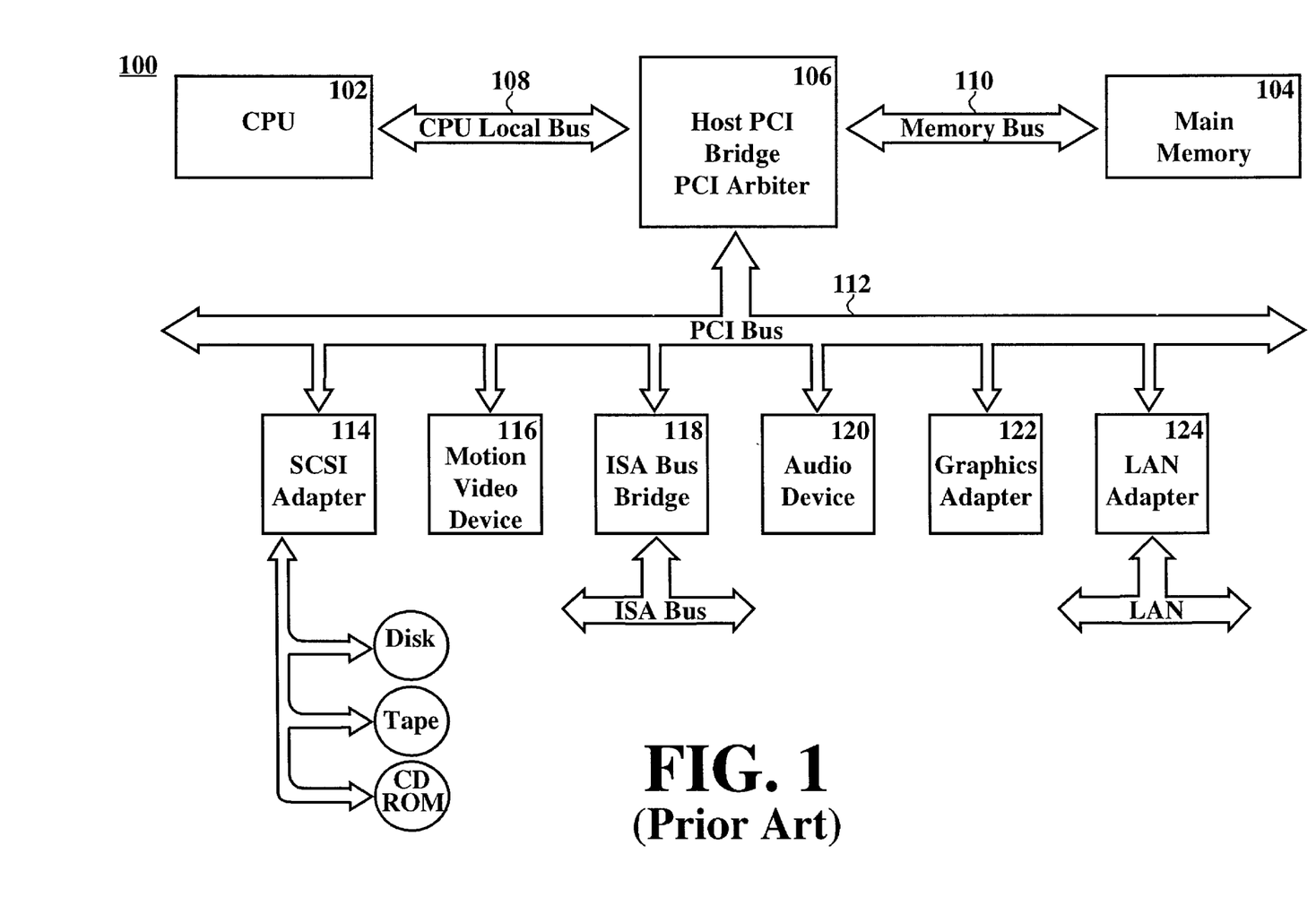
FIG. 1 shows a typical PCI bus architecture of the prior art.

Prior Art FIG. 1 shows a typical PCI bus architecture 100. PCI bus architecture 100 is comprised of a CPU 102 and a main memory 104, both coupled to a host PCI bridge arbiter 106 (hereafter PCI arbiter 106). CPU 102 is coupled to PCI arbiter 106 through a CPU local bus 108. Main memory 104 is coupled to PCI arbiter 106 by memory bus 110. The PCI bus 112 is coupled to arbiter 106 and to each of the PCI compliant devices or "agents" 114, 116, 118, 120, 122, 124 respectively. PCI agents 114, 116, 118, 120, 122, 124 (hereafter referred to collectively as PCI agents 114–124) residing on PCI bus 112 use PCI bus 112 to transmit and receive information and signals. PCI bus 112 is comprised of functional signal lines and data lines; for example, interface control lines, address/data lines, error signal lines, and the like. PCI agents 114–124 follow a definitive set of protocols and rules designed to standardize the method of accessing, utilizing, and relinquishing PCI bus 112. PCI bus protocols and specifications are set forth in an industry standard PCI specification (e.g., PCI Specification—Revision 2.1).

The industry standard PCI specification dictates that when one of the PCI agents 114–124 requires the use of PCI bus 112 to transmit or receive data, the PCI agent requests PCI bus 112 "ownership" from PCI arbiter 106. The PCI agent requesting ownership is referred to as a PCI initiator agent, or master device. The term master device is generically used in bus systems, including systems other than PCI. Each of the PCI agents 114–124 may independently act as a PCI initiator agent and request PCI bus ownership. Thus, at any given time several of the PCI agents 114–124 may be requesting PCI bus ownership simultaneously. Where there are simultaneous requests for PCI bus ownership, PCI arbiter 106 arbitrates between requesting PCI agents to determine which requesting PCI agent will be granted PCI bus ownership. In accordance with PCI architecture standards, only one data transaction can take place on a PCI bus at any given time. Therefore, the arbiter only grants PCI bus access to one PCI initiator agent at any given time and no other PCI initiator agents may conduct a transaction on the PCI bus at the same time. The PCI agent the PCI initiator agent is attempting to communicate with is referred to as a PCI target agent (e.g., main memory 104) or slave device. The term slave device is generically used in bus systems, including systems other than PCI. It is only after the PCI initiator agent has been granted PCI bus ownership that the PCI initiator agent attempts to access the PCI target agent and initiate a transaction (e.g., data transfer).

The PCI initiator agent begins the transaction by identifying or addressing the PCI target agent during the address phase of the transaction. Once the PCI target agent senses it is being addressed, continuation of a transaction is dependent on the PCI target agent. If the PCI target agent indicates it is ready the transaction continues. When the PCI initiator agent has completed its transaction, it relinquishes ownership of the PCI bus 112, allowing PCI arbiter 106 to reassign PCI bus 112 to another PCI initiator agent. However, if the PCI target agent is not ready for the transaction to continue, it signals the PCI initiator agent to retry. By signaling a retry, the PCI target agent is instructing the PCI initiator agent to stop the current transaction and try to complete it later.

The PCI target agent may issue a retry for many reasons. For example, in computer systems with one or more PCI agents which are slower than others (as is often the case), slower PCI target agents issue retry signals to avoid PCI bus "monopolization" by particular PCI agents. The industry standard PCI specification dictates that a PCI initiator agent should issue a retry if its latency will exceed 16 PCI clock cycles. If the industry standard PCI specification did not require slow PCI target agents to issue retry signals under certain conditions, transactions with the slowest PCI agent could occupy the PCI bus 112 for long periods of time and effectively "monopolize" the PCI bus. For example, PCI agent 118 is an ISA (industry standard architecture) bus bridge and is typically much slower than the other PCI agents. In addition, other peripheral devices coupled to the ISA bus can be slower still, resulting in PCI agent 118 typically having a very slow access time from the viewpoint of a PCI initiator agent (e.g. PCI agent 122). This relative slowness potentially causes a PCI initiator agent (e.g., PCI agent 122) to wait a relatively long period of time between accessing the PCI bus 112 and beginning the data transaction phase, tying up PCI bus 112 in the process.

It should be noted that there may be other reasons a PCI target agent may have a slow access time. For example, the PCI target agent may be busy with some internal activity and is unable to service the access at that time, or the access would generate some sort of internal conflict (e.g., with data ordering or coherency). Accordingly, where a PCI target agent "knows" it will be slow completing a transaction, it may issue a retry in order to free up the PCI bus for other PCI initiator agents. In accordance with industry standard PCI specifications, when a PCI target agent issues a retry signal the PCI initiator agent must terminate its access of the PCI bus and retry later.

In addition to providing order to the communication process, the industry standard PCI specifications typically try to provide for protocols that enhance the computer system's performance. Given the general proposition that the faster information and signals are communicated, the better the performance of a computer system, most PCI initiator agents are designed to complete their access in the minimum time possible. Accordingly, when the PCI initiator agent receives a retry from the PCI target agent, the PCI initiator agent deasserts the request for the minimum time allowed by PCI standards (i.e., two PCI clocks) and then retries the access. This process is repeated until the access is successful, that is, until the data is transferred between the PCI initiator agent and PCI target agent. However, the PCI initiator agent's quickly repeated retry attempts often occur before the PCI target agent has had sufficient time to clear the condition that caused it to issue the retry in the first place. Hence, the PCI target agent issues repeated retry signals.

Figure 2:
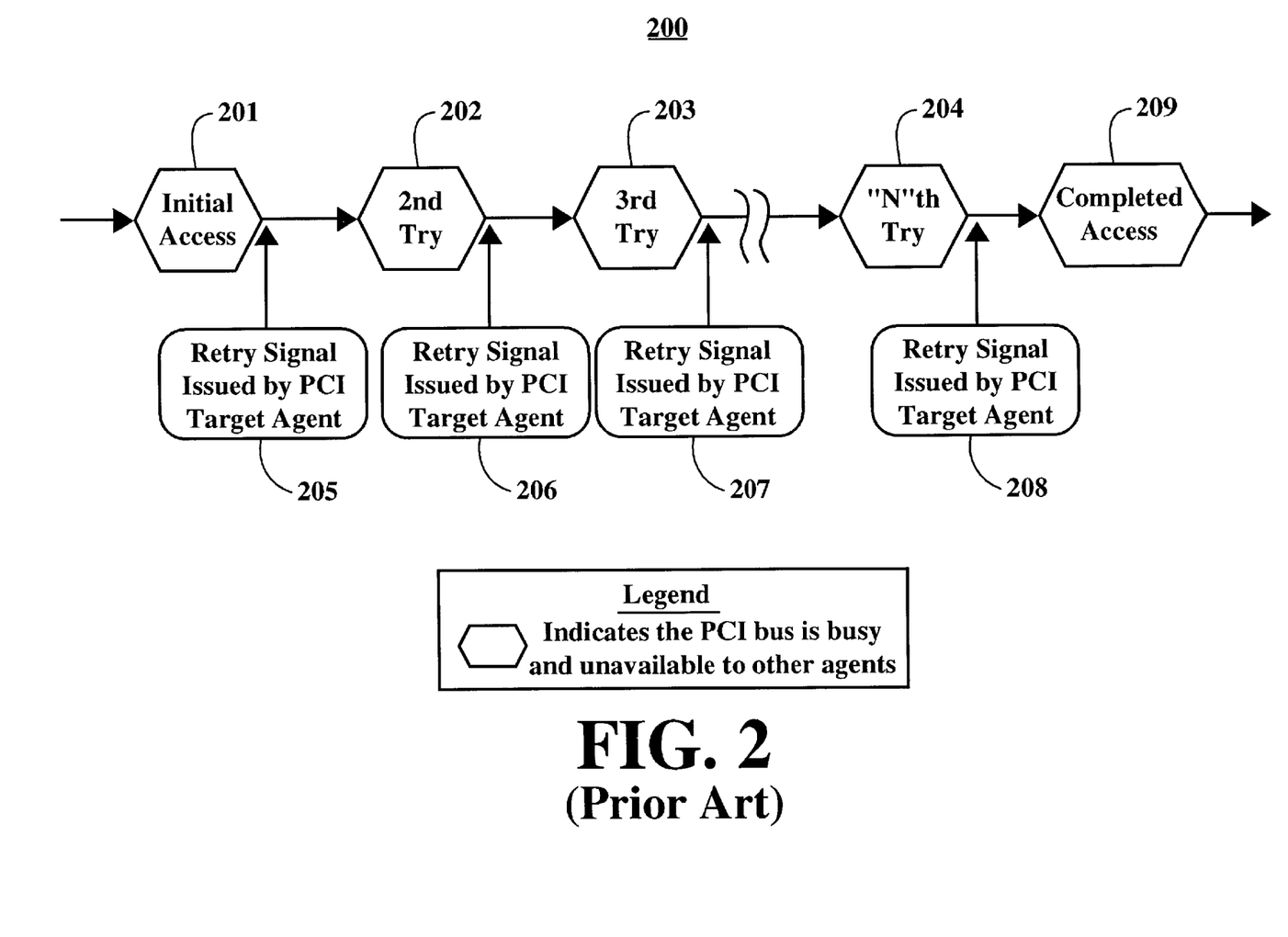
FIG. 2 is a schematic diagram illustrating a conventional PCI bus retry process associated with the prior art.

FIG. 2 shows a diagram of a prior art retry access process 200. Process 200 depicts a typical access sequence when a PCI target agent is not ready for a transaction and issues a retry to the PCI initiator agent. For example, the PCI initiator agent may have a high data transfer rate (e.g., PCI agent 122) and the PCI target agent is a device that has a slow data transfer rate and a high latency (e.g., PCI agent 118). On the left side of process 200, the PCI initiator agent attempts to access the PCI target agent, shown as the initial access 201. The initial access is comprised of a normal PCI arbitration process and the usual initial steps of a PCI transaction. For example, the PCI initiator agent requests the PCI bus, the arbiter eventually decides (usually in accordance with a system specific algorithm) to grant the PCI initiator agent access to the PCI bus, the PCI initiator agent addresses the PCI target agent and identifies the type of transaction. The PCI target agent is not ready and issues a retry 205. This forces the PCI initiator agent to relinquish the PCI bus (i.e., PCI bus 112) for other uses. The PCI initiator agent subsequently arbitrates for and acquires the PCI bus for a second try 202. The PCI target agent is still not ready, and thus, issues retry 206, forcing the PCI initiator agent to again relinquish the PCI bus. In accordance with PCI protocol, the PCI initiator agent continually attempts to execute its data transaction (as shown by third try 203 through "N" th try 204) and is forced to retry (207 through 208 respectively) until the PCI target agent is ready and the transaction is completed 209.

During each try (202, 203 and 204) the PCI bus is unnecessarily tied up by the PCI initiator agent repeatedly addressing the PCI target agent and trying to transfer data when the PCI target agent is not ready. As indicated in legend 210, the space occupied by the hexagonal figures in process 200 represents occupied PCI bus access time that is essentially wasted because the PCI target agent is not ready.

That is, no other PCI agents can access the PCI bus during the PCI initiator agent's repeated accesses of the PCI bus. This slows down the speed at which a computer system can complete tasks. Thus, when a PCI initiator agent repeatedly attempts to access a PCI target in response to retry signals, and the PCI target agent is not ready, a computer system's performance and functionality is usually diminished.

Thus, what is required is a method and system which reduces wasted retry attempts. The required method and system should enhance the performance of a computer system by increasing the data transfer rates and bandwidth of computer system buses. What is further desired is a method and system to coordinate the timing of bus access retry attempts to optimize the probably of successfully completing the transaction and reducing wasted bus access time. The present invention provides a novel solution to the above requirements.

SUMMARY OF THE INVENTION

The present invention is a novel smart retry method and system which reduces wasted bus time associated with futile retry attempts by master devices. By reducing futile and wasteful grants of bus time the invention significantly increases available bus data transfer bandwidth. The present invention synchronizes the timing of bus access retry attempts to instances that optimize the probability of successfully completing the transaction, thus reducing wasted bus access time.

In one embodiment, the present invention comprises a smart retry system for a device in a computer system. The smart retry system of the present invention includes a master device, a slave device, an arbiter, and a smart retry logic component, all adapted to be coupled to a bus. The bus permits devices coupled to the bus to communicate with the arbiter and other devices coupled to the bus. The smart retry logic component of the present invention prevents a master device from accessing the bus for the purpose of attempting a retry transaction, until after the slave device that issued the retry is ready.

Another embodiment comprises a smart retry system implemented in a PCI (peripheral component interconnect) system. When signaled by a PCI target agent not to grant a particular PCI initiator agent access to a PCI bus, a PCI arbiter masks the PCI initiator agent's requests for PCI bus access. Thus, the smart retry system minimizes the time a PCI initiator agent ties up the PCI bus with futile retry attempts to access a PCI target agent.

BRIEF DESCRIPTION OF THE DRAWINGS

The accompanying drawings which are incorporated in and form a part of this specification, illustrate embodiments of the invention and together with the description, serve to explain the principles of the invention.

BEST MODE FOR CARRYING OUT THE INVENTION

Reference will now be made in detail to the preferred embodiments of the invention, a smart retry system that reduces wasted bus transactions associated with master retries, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

One embodiment of the present invention involves a smart retry system that minimizes wasted PCI bus time associated with futile retry attempts by PCI initiator agents when a PCI target agent is not ready. The smart retry system of the present embodiment allows for more effective utilization of PCI bus time when a PCI initiator agent attempts a data transaction with a PCI target agent. The system of the present embodiment significantly increases the PCI bus data transfer bandwidth available to other PCI agents. In addition, when a PCI initiator agent attempts a retry, the present embodiment provides for the PCI bus to be granted to a PCI initiator agent at a time that optimizes the probability that the PCI initiator agent will successfully access the PCI target agent. The present invention and its benefits are discussed in greater detail below.

Figure 3:
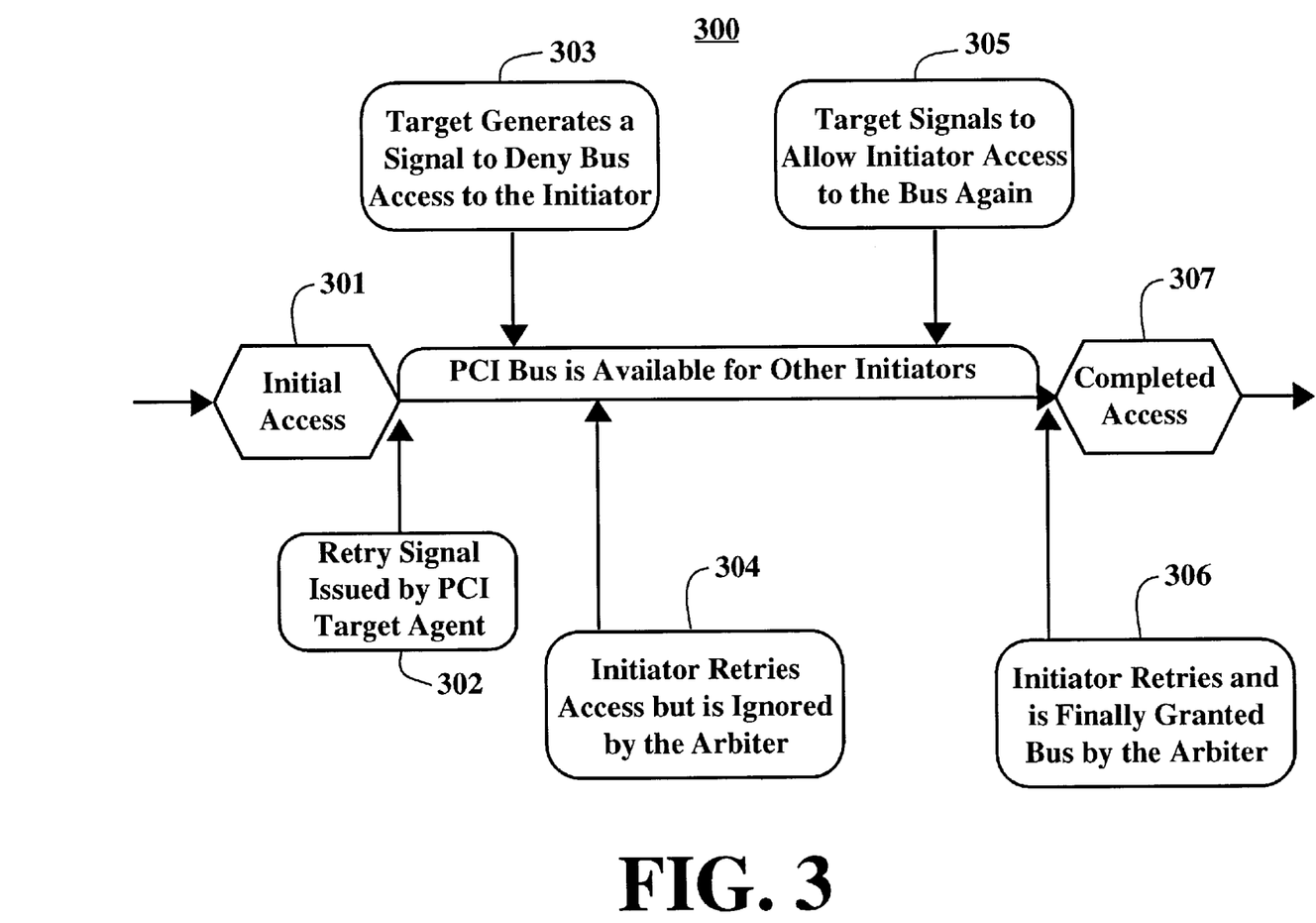
FIG. 3 is a process flow diagram illustrating a smart PCI bus retry process associated with one embodiment of the present claimed invention.

FIG. 3 shows a block diagram of a smart retry access process 300 utilized in accordance with one embodiment of the present invention. On the left side of process 300 in step 301, a PCI initiator agent accesses a PCI target agent and attempts a data transmission. The initial access is comprised of the normal stages of a PCI transaction (e.g., arbitration for PCI bus ownership, receiving a grant signal from a PCI arbiter, addressing and informing a PCI target agent of the data to be transferred, etc.). In step 302 the PCI target agent issues a retry in instances where the PCI target agent is busy and cannot complete the data transaction.

In step 303, in accordance with the present invention, the PCI target agent issues a first signal or bus denial signal, that indicates the smart retry system should deny PCI bus access to the PCI initiator agent. Denying the PCI initiator agent PCI bus access permits the PCI bus to be available for use by other PCI initiator agents. Thus, in step 304 the PCI initiator agent repeatedly attempts to access the PCI bus but is not granted access. In so doing, the smart retry system of the present invention minimizes wasted time associated with futile retry attempts. That is, unlike prior art, the present embodiment prevents the PCI initiator from arbitrating for PCI bus ownership, receiving a grant signal, addressing and attempting to access the PCI target agent. Hence, all of that "wasted" PCI bus time is eliminated by the present embodiment.

In step 305, when the PCI target agent is no longer busy it signals the PCI arbiter to grant PCI bus access to the PCI initiator agent. In step 306 the PCI initiator agent retries and is finally granted PCI bus access. In step 307 the PCI initiator agent successfully accesses the PCI target agent and completes a data transmission.

It should be appreciated that the present embodiment relies on a PCI initiator agent attempting to access only one PCI target agent at a time. It should be further appreciated that in the preferred embodiment, when a PCI target agent issues a retry, the PCI initiator agent repeatedly requests the PCI bus for purposes of accessing the same PCI target agent. The PCI initiator agent does this until it completes a transaction with the PCI target agent that issued the retry, before attempting to access any other PCI target agents. PCI systems typically behave in this manner. That is, if a retry is issued the PCI initiator agent continually retries to access the same PCI target agent before attempting to access any other PCI target agents.

It should be appreciated the present invention can be adapted by one skilled in the art to accommodate other configurations of a PCI system. For example, when a PCI target agent signals a PCI initiator agent to retry later, the PCI initiator agent can access the PCI bus for purposes of communicating with other PCI target agents. However, unless the PCI target agent is ready, the PCI initiator agent can not access the PCI bus for purposes of communicating with the PCI target agent that issued the retry.

Figure 4:
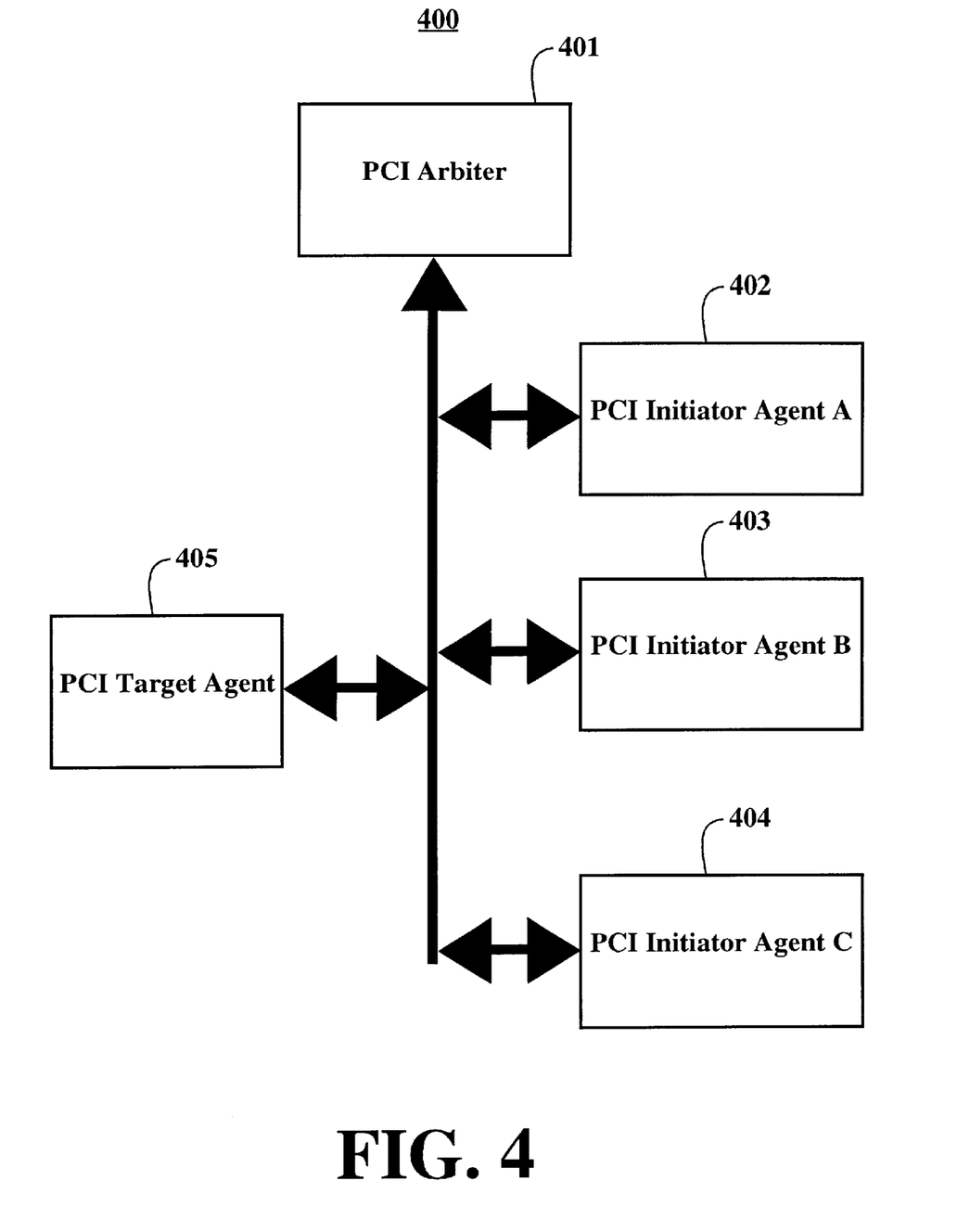
FIG. 4 is a schematic diagram of one embodiment of a PCI bus system.

FIG. 4 shows a general PCI system 400, in accordance with one embodiment of the present invention. PCI system 400 includes the following items all coupled to PCI bus 406: PCI arbiter 401, PCI initiator agent A 402, PCI initiator agent B 403, PCI initiator agent C 404, and PCI target agent 405. So as not to unnecessarily obscure the current invention, only one PCI target agent 405 is shown. However, as discussed below, it should be appreciated that other embodiments of the present invention can be realized in systems comprising a plurality of PCI target agents. PCI bus 406 contains a plurality of communication lines.

Figure 5:
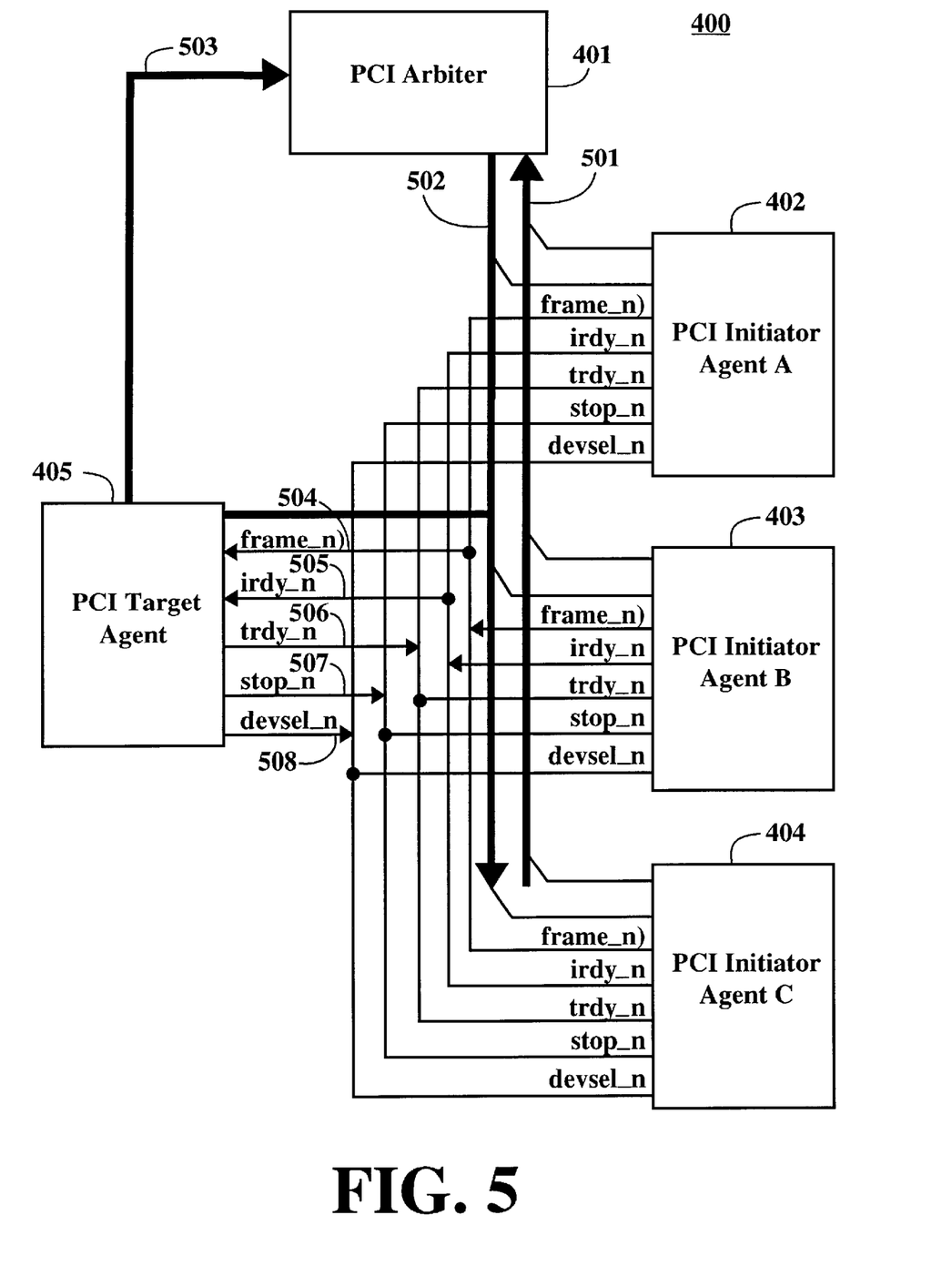
FIG. 5 is a schematic diagram illustrating PCI bus signals implemented in a smart PCI bus retry system in accordance with one embodiment of the present claimed invention.

FIG. 5 shows PCI system 400 with signal and data lines broken out of PCI bus 406. PCI bus 406 comprises the following data and signal lines: request bus req_n (2:0) 501, grant bus gnt_n (2:0) 502, bus_request_mask (2:0) 503, frame_n 504, irdy_n 505, trdy_n 506, stop_n 507 and devsel_n 508. PCI Bus 406 further comprises data and signal lines that have not been shown in detail in FIG. 5 so as not to unnecessarily obscure the current invention. PCI target agent 405 of the present embodiment includes the ability to access a second signal (hereinafter referred to as the PCI bus grant signal) indicating the grant status of the PCI bus 406. It should appreciated that the PCI bus grant signal is communicated via the grant bus gnt_n (2:0) 502 shown in FIG. 5. The grant bus gnt_n (2:0) 502 is snooped by PCI initiator agents 402, 403 and 404 and, in accordance with the present embodiment, the grant bus gnt_n (2:0) 502 is also snooped by PCI target agent 405. By snooping the grant bus gnt_n (2:0) 502 the PCI target agent 405 can determine which PCI initiator agent is trying to access it.

Once a PCI target agent knows which PCI initiator agent is trying to access the PCI target agent, the PCI target agent can issue a bus denial signal to a smart retry system of the present invention. The bus denial signal directs the smart retry system to deny PCI bus access to a PCI initiator agent (respectively 402, 403 or 404). In one embodiment, the signal is referred to as a bus request mask signal and is communicated to a PCI arbiter 401 via bus_request_mask (2:0) 503. It should be appreciated that in one embodiment, there are as many lines or bits in bus_request_mask (2:0) 503 as there are possible PCI initiator agents. Each bit in bus_request_mask (2:0) 503 corresponds to a bit in grant bus gnt_n (2:0) 502. It will be obvious to one skilled in the art that the bus denial signal may be accomplished by other implementations, such as an alternate embodiment where coded signals are sent over a single line.

Figure 6:
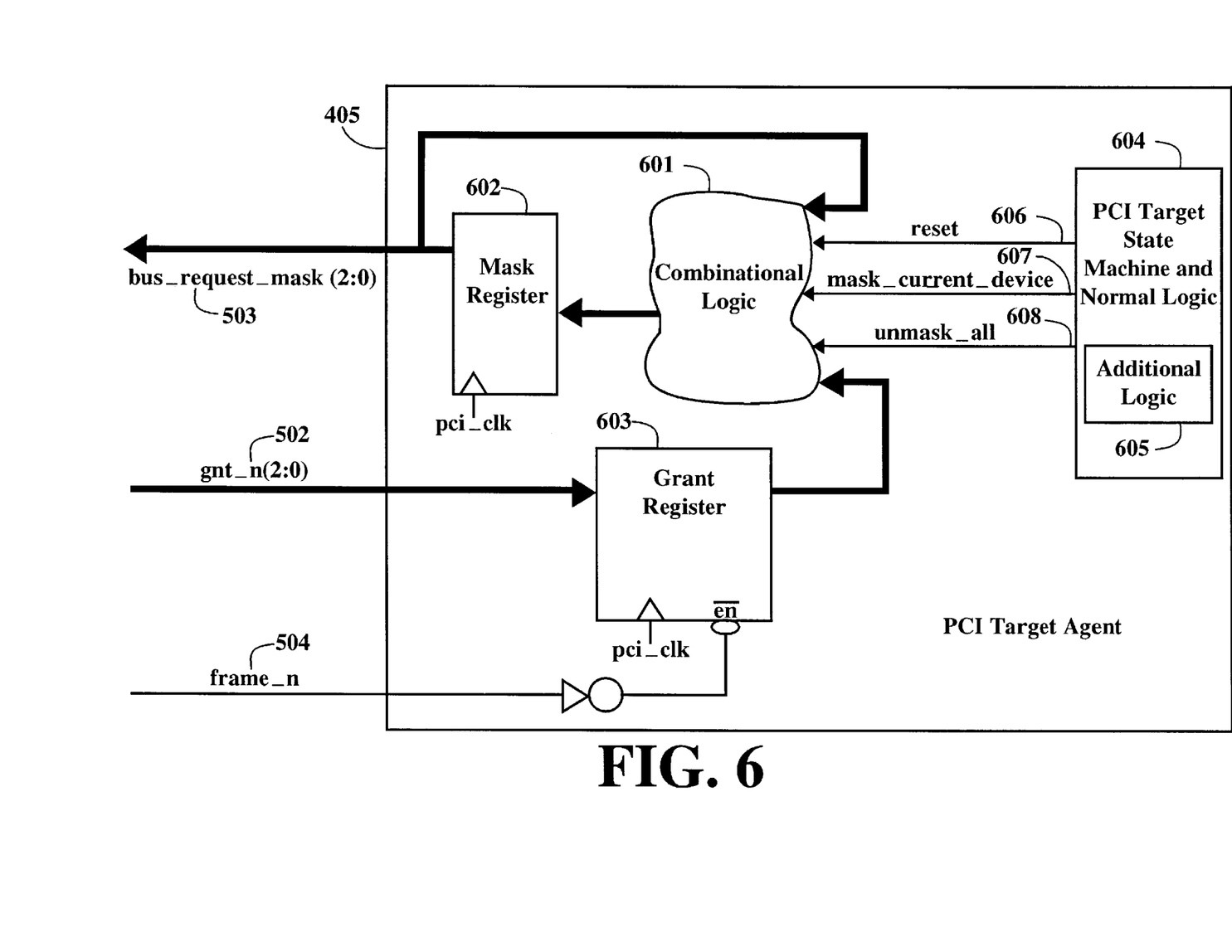
FIG. 6 is a schematic diagram illustrating one embodiment of a smart PCI bus system PCI target agent utilized in accordance with the present claimed invention.

FIG. 6 shows one implementation of PCI target agent 405 in accordance with the present invention. PCI target agent 405 incorporates components of a smart retry PCI bus system. PCI target agent 405 comprises a first logic component, combinational logic 601, for generating a bus_request_mask signal to a PCI arbiter, a second logic component, mask register 602, that maintains the bus_request_mask signal for a period of time, a third logic component, grant register 603 for storing PCI bus grant signals, logic 604 associated with a typical PCI target agent design, and a fourth logic component, additional logic 605, for controlling the first logic component 601. In the present embodiment combinational logic 601, mask register 602, grant register 603, and additional logic 605, are only cited as examples of a first logic component, a second logic component, a third logic component and a fourth logic component. It should be appreciated that a person skilled in the art will recognize that there are multiple means and methods of accomplishing other embodiments.

It should be appreciated that in the preferred embodiment, the first logic component 601 comprises combinational logic circuitry. The second logic component 602 comprises a first register. The third logic component 603 comprises a second register. The usual logic 604 comprises the normal logic of a PCI target state machine. The fourth logic component 605 comprises additional logic to control combinational logic component 601 through the following signals: reset 606, mask_current_device 607 and unmask_all 608.

The present embodiment works as follows. PCI bus grant signals carried on grant bus gnt_n (2:0) 502 are registered in register 603. The registered values reflect the state of PCI bus grants when a current PCI initiator agent started its PCI cycle. When a signal on frame_n 504 is deassertea register 603 latches bus grant signal information. Register 603 stops latching bus grant signal information as soon as frame_n 504 is asserted. Thus, the bus grant signal information is registered so that the registered value reflects the state of the bus grants when the current PCI initiator agent started its PCI cycle. The registered bus grant signal information is sent to combinational logic 601. If PCI target agent 405 issues a retry to a PCI initiator agent and wishes for PCI arbiter 401 to ignore this PCI initiator agent, additional logic 605 causes logic 604 to assert mask_current_device signal 607 so that the combinational logic 601 causes the current bus PCI initiator agent's bus request mask bit to be asserted. At a later point, when the PCI target agent 405 is ready to accept the PCI initiator agent's data, the PCI target agent asserts its unmask_all 608 signal so that the combinational logic 601 causes all of the bus_request_mask (2:0) 503 bits to be deasserted. This then tells the PCI arbiter 401 that the PCI target agent 405 is ready for the PCI arbiter to look at all PCI bus request signals on request bus req_n (2:0) 501.

Other embodiments may choose to design a more complicated PCI target agent 405 to allow more specificity when unmasking PCI bus requests. For example, the PCI target agent 405 may wish to only unmask the PCI bus request corresponding to a PCI Initiator agent for which it has a pending delayed transaction. It may not wish to unmask other PCI initiator agent's PCI bus requests if these devices attempted to access PCI target agent 405 while it was busy and could not complete the other transactions. It would unmask the later PCI bus requests only when it had completed the first delayed transaction and could service their data transfers.

Figure 7:
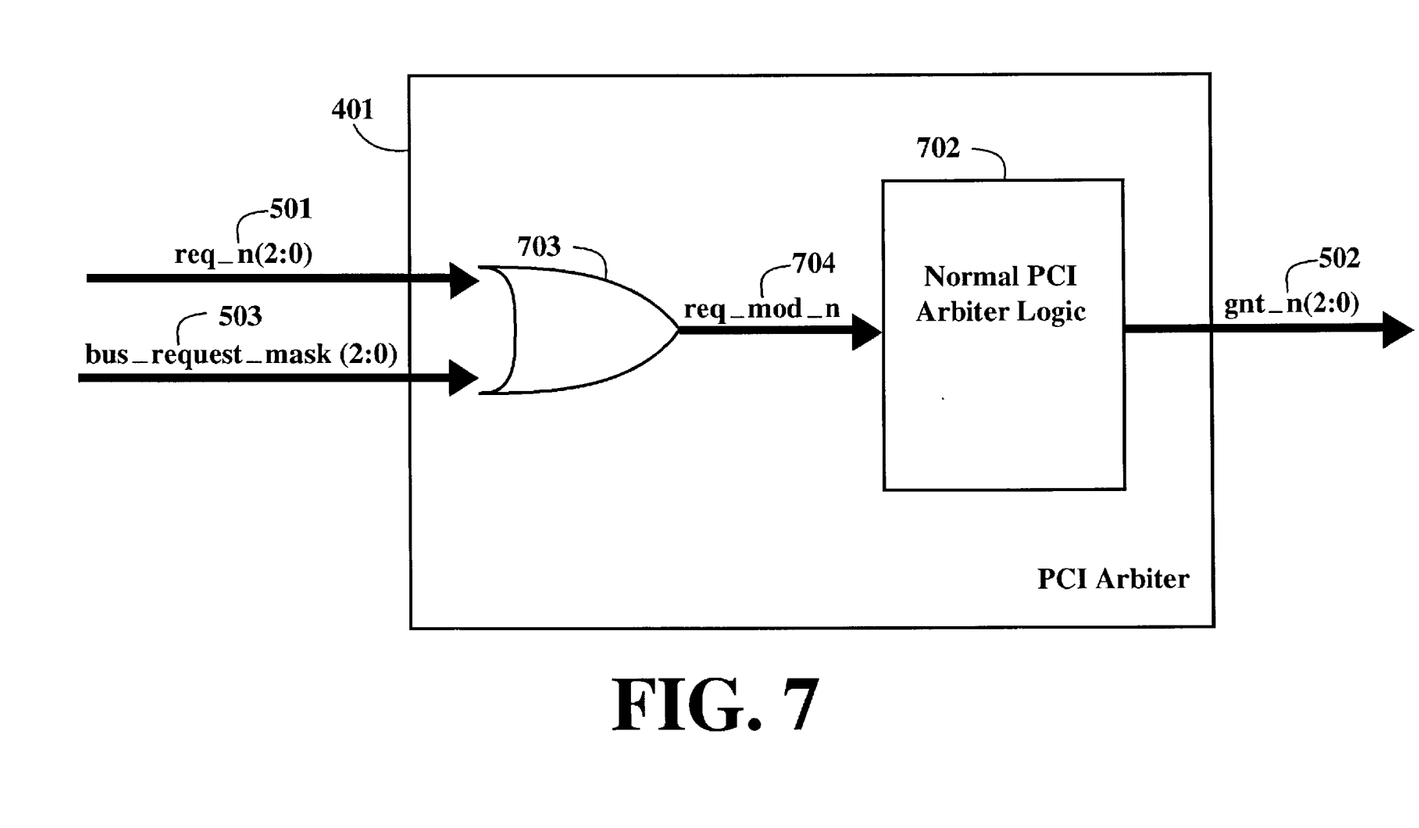
FIG. 7 is a schematic diagram illustrating a smart PCI bus system arbiter utilized in accordance with one embodiment of the present claimed invention.

FIG. 7 shows another embodiment of PCI arbiter 401 modified to include a masking logic component 703. The modification in the present embodiment comprises an "OR" gate. In the present embodiment, signals on request bus req_n (2:0) 501 are asserted low (logical 0), the signals on bus_request_mask (2:0) 503 are asserted high (logical 1), and the signals on req_mod_n (2:0) 704 are asserted low (logical 0). Thus, if the signals on bus_request_mask (2:0) 503 are asserted high (logical 1) no requests from a corresponding PCI initiator agent are processed. Hence, the only time a bus request from a PCI initiator agent is allowed to proceed past the masking logic component to arbitration is when a PCI initiator agent is requesting the bus (req_n (2:0) 501 equals logical 0) and the target is not trying to mask the request (bus_request_mask (2:0) 503 is logical 0). One skilled in the art will recognize that there are multiple means and methods of accomplishing other embodiments. The signals on req_mod_n 704 are then fed into a normal PCI arbiter logic component 702 and processed in accordance with well know arbitration procedures.

It should be appreciated that only one PCI target agent 405 and three PCI initiator agents (402, 403 and 404) have been shown in FIGS. 4 and 5 so as not to unnecessarily obscure the present invention. Other embodiments of the present invention can easily accommodate multiple PCI initiator agents and PCI target agents. For example, one alternate embodiment comprises an "OR" logic gate for each PCI initiator agent, in which each "OR" gate is coupled to PCI initiator agent request signals and PCI target agent bus-request-mask signals similar to logic component 703.

Figure 8A:
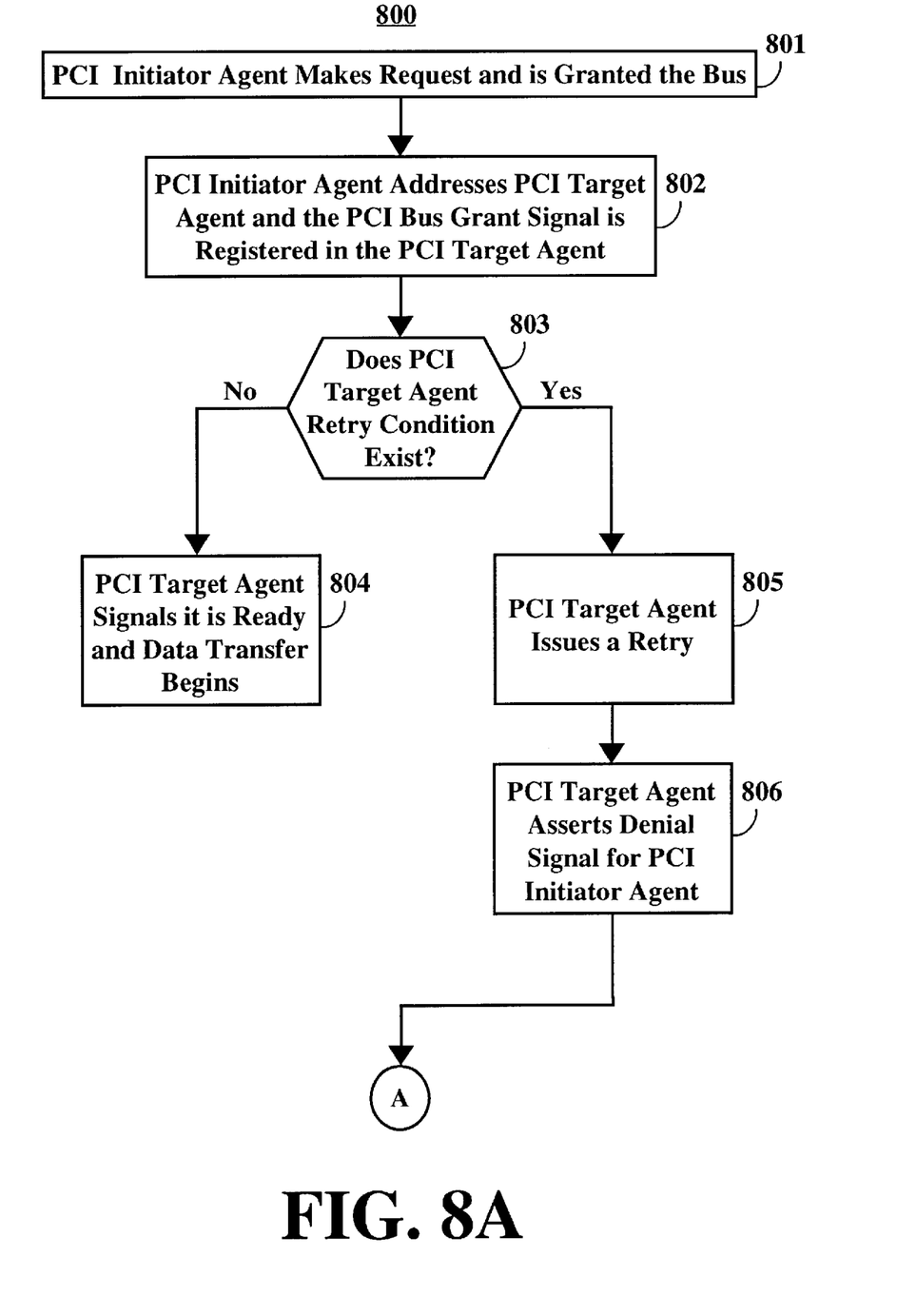
FIG. 8 is a flow chart illustrating steps of a process employed in accordance with one embodiment of the present claimed invention.
Figure 8B:
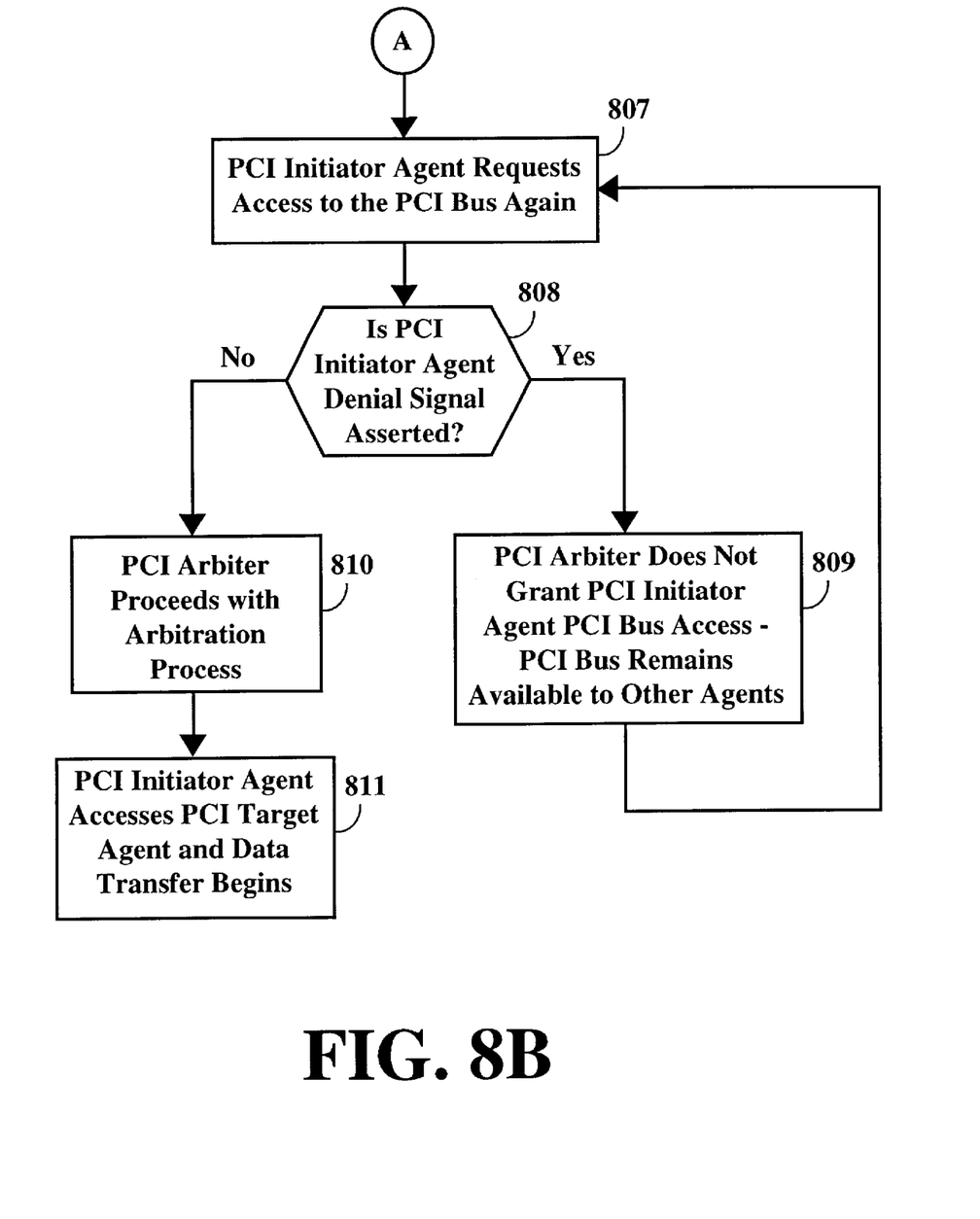

Referring now to FIG. 8, a flow chart 800 illustrating process steps associated with one embodiment of the present invention is shown. Process 800 comprises steps involved in one embodiment of a smart retry system process. The process 800 begins with step 801, when a PCI initiator agent sends a PCI bus request signal to a PCI arbiter, and the PCI initiator agent is granted the PCI bus by the PCI arbiter.

In step 802, the PCI initiator agent addresses the PCI target agent, attempts an initial access, and, in accordance with the present embodiment, a PCI bus grant signal is registered in the PCI target agent.

In step 803, of the present embodiment the PCI target agent determines if a retry condition exists, for example; the PCI target agent is busy with an internal activity, engaging in a transaction which will generate a conflict, the PCI target agent will be slow in completing the transaction, etc.

If a retry condition does not exist, in step 804, the PCI target agent signals that it is ready and the data transfer begins.

If a PCI target agent retry condition does exist, the process continues to step 805. In step 805, the PCI target agent signals the PCI initiator agent to retry.

In step 806, the PCI target agent asserts a bus_request_mask signal for the PCI initiator agent.

The process of the present embodiment proceeds to step 807, in which the PCI initiator agent attempts to retry accessing the PCI target agent again after 2 PCI bus cycles.

In step 808, the PCI arbiter determines if a bus denial signal is asserted. The PCI arbiter effectively makes this determination by means of the modified logic 703, which "masks" or prevents the normal PCI arbiter logic from receiving a request from the PCI initiator agent if a bus denial signal is asserted. If a bus denial signal is asserted the PCI the process proceeds to step 809.

In step 809 the arbiter does not grant the PCI initiator agent the PCI bus. In an embodiment employing standard PCI protocol, the PCI initiator agent requests access to the PCI bus again after 2 PCI bus cycles by returning to step 807. This process of looping through steps 807, 808, 809 and back to 807 continues until step 808 determines that a bus denial signal is not asserted.

When a bus denial signal is not asserted the modified arbitration logic 703 permits a bus request to effectively "pass" through to the normal PCI arbiter logic 702. After the normal arbitration process the PCI initiator agent is eventually granted access to the PCI bus in step 810.

In step 811 the PCI initiator agent addresses the PCI target agent, the PCI target agent indicates that it is ready, and the data transfer begins.

The present invention is a novel smart retry method and system which reduces wasted bus time associated with futile retry attempts by master devices. By reducing futile and wasteful grants of bus time the invention significantly increases available bus data transfer bandwidth. The present invention synchronizes the timing of bus access retry attempts to instances that optimize the probability of successfully completing the transaction, thus reducing wasted bus access time.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A smart retry system for a bus system, comprising:

a bus, said bus adapted to communicate information;

a master device coupled to said bus, said master device adapted to communicate via said bus;

a plurality of slave devices coupled to said bus, said plurality of slave devices adapted to communicate via said bus and wherein each one of said plurality of slave devices is further adapted to issue a denial signal when said slave device is busy;

a single arbiter coupled to said bus, said arbiter adapted to communicate via said bus and to regulate access to said bus by said master device and said plurality of slave devices, wherein said arbiter further comprises a logic system coupled to said bus, said logic system adapted to prevent said master device from accessing each one of said plurality of slave devices when a corresponding said each one of said plurality of slave devices issues a denial signal; wherein said logic system includes a logic component adapted to mask a request signal from said master device when said slave device issues said denial signals, wherein said logic system is adapted to prevent said master device from accessing said bus.

2. The smart retry system of claim 1 wherein said logic system is integral with said target device.

3. The smart retry system of claim 1 wherein said logic system is integral with said arbiter.

4. A smart retry system for a PCI (peripheral component interconnect) bus system, comprising:

a PCI bus, said PCI bus adapted to communicate information;

a PCI initiator agent coupled to said PCI bus, said PCI initiator agent adapted to communicate via said PCI bus;

a plurality of PCI target agents coupled to said PCI bus, said plurality of PCI target agents adapted to communicate via said PCI bus and wherein each one of said plurality of PCI target agents is further adapted to issue a denial signal when said PCI target agent is busy; and a single PCI arbiter coupled to said PCI bus, said PCI arbiter adapted to communicate via said PCI bus and to regulate access to said PCI bus by said PCI initiator agent and said plurality of PCI target agents, wherein said arbiter further comprises a logic system coupled to said PCI bus, said logic system adapted to prevent said PCI initiator agent from accessing said each one of said plurality of PCI target agents when a corresponding said each one of said plurality of PCI target agents generates a denial signal, wherein said logic system is adapted to prevent said PCI initiator agent from accessing said PCI bus when said PCI target agent generates said denial signal.

5. The smart retry system of claim 4, wherein said PCI target agent further comprises:

a denial logic component adapted to generate said first signal.

6. The smart retry system of claim 5, wherein said first logic component further comprises combinational circuitry.

7. The smart retry system of claim 4 wherein said logic system is integral with said target device.

8. The smart retry system of claim 4 wherein said logic system is integral with said arbiter.

9. A PCI target agent comprising:

a first logic component including combination logic adapted to generate a bus request mask signal to a PCI arbiter;

a second logic component coupled to said first logic component, said second logic component comprise a mask register adapted to maintain said bus request mask signal for a period of time;

a third logic component coupled to said first logic component, said third logic component comprising a grant register adapted to store PCI bus grant signals; and a fourth logic component coupled to said first logic component, said fourth logic component comprising a PCI target state machine adapted to control said PCI target agent operations and additional logic adapted to control said first logic component via reset instructions, mask current device instructions and unmask all instructions.

\* \* \* \* \*